United States Patent
Owens (10) Patent No.: US 7,079,527 B2
(45) Date of Patent: Jul. 18, 2006

(54) SYSTEM AND METHOD FOR PROVISIONING BROADBAND SERVICE IN A PPPOE NETWORK USING DTMF COMMUNICATION

(75) Inventor: Craig Braswell Owens, San Carlos, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 848 days.

(21) Appl. No.: 09/960,568

(22) Filed: Sep. 20, 2001

(65) Prior Publication Data
US 2003/0053443 A1    Mar. 20, 2003

(51) Int. Cl.
H04L 12/66 (2006.01)

(52) U.S. Cl. ............ 370/352; 370/354; 379/90.01

(58) Field of Classification Search .......... 370/352, 370/466–469, 401–410, 389–397, 355, 252; 370/351, 236, 354; 375/219–222, 90.01; 379/93.01, 93.29, 218.01, 201.08, 223; 455/436
See application file for complete search history.

(56) References Cited

U.S. PATENT DOCUMENTS

| | | | |
|---|---|---|---|
| 4,970,721 A * | 11/1990 | Aczel et al. ............. | 370/355 |
| 6,424,657 B1 | 7/2002 | Voit et al. | |
| 6,542,500 B1 * | 4/2003 | Gerszberg et al. ......... | 370/354 |
| 6,614,781 B1 * | 9/2003 | Elliott et al. ............. | 370/352 |
| 6,636,505 B1 * | 10/2003 | Wang et al. ............. | 370/352 |
| 6,667,971 B1 | 12/2003 | Modarressi et al. | |
| 6,700,955 B1 * | 3/2004 | Davis et al. ............. | 379/90.01 |
| 6,763,012 B1 | 7/2004 | Lord et al. | |
| 6,798,751 B1 | 9/2004 | Voit et al. | |
| 6,829,234 B1 * | 12/2004 | Kaplan et al. ............. | 370/352 |
| 6,928,463 B1 | 8/2005 | Tene et al. | |
| 6,958,996 B1 | 10/2005 | Xiong | |
| 6,977,906 B1 | 12/2005 | Owens et al. | |
| 2001/0019559 A1 | 9/2001 | Handler et al. | |
| 2002/0004935 A1 | 1/2002 | Huotari et al. | |
| 2002/0080754 A1 | 6/2002 | Travostino et al. | |
| 2002/0136226 A1 | 9/2002 | Christoffel et al. | |
| 2002/0176404 A1 | 11/2002 | Girard | |

* cited by examiner

*Primary Examiner*—Chi Pham
*Assistant Examiner*—Prenell Jones
(74) *Attorney, Agent, or Firm*—Georgann S. Grunebach (57) ABSTRACT

A Plain Old Telephone System (POTS) connection is established between a Broadband modem and a remote server. A configuration request is then transmitted from the Broadband modem to the remote server using DTMF tones. Subsequently a domain name associated with a Broadband Service Node (BSN) and a user identifier, such as a telephone number, is received from the remote server via the POTS connection using Dual-Tone Multi-Frequency (DTMF) tones. A PPPoE session is then established using the domain name, by firstly authenticating the Broadband modem for the PPPoE session and then configuring the DSL modem. This configuration is accomplished by transmitting a request for configuration details from the Broadband modem to the BSN having the domain name and then receiving configuration details from the configuration server. The Broadband modem then automatically configures itself using the configuration details.

24 Claims, 6 Drawing Sheets

SYSTEM AND METHOD FOR PROVISIONING BROADBAND SERVICE IN A PPPOE NETWORK USING DTMF COMMUNICATION

BACKGROUND OF THE INVENTION

1. Field of the Invention

The present invention relates generally to broadband telecommunications, and particularly to a system and method for provisioning broadband service in a Point-to-Point over Ethernet (PPPoE) network using Dual-Tone MultiFrequency (DTMF) tones.

2. Description of Related Art

While high-speed or Broadband Internet connections to large businesses have been in existence for some time, Broadband Internet connections to homes and small businesses have only recently become more commonplace. Broadband technologies such as ISDN (Integrated Services Digital Network), cable modems, satellite, and DSL (Digital Subscriber Line), are all competing for market share. The two technologies at the forefront, DSL and cable, offer much faster Internet access than dial-up modems, for a cost substantially lower than ISDN.

Analog modems over regular telephone lines are not fast enough for today's Broadband multi-media content. In fact, so-called 56 Kbps modems actually move data at approximately 44 Kbps because of telephone-line imperfections. Furthermore, these modems only reach that speed when receiving data, not sending it.

Typically, analog modems generally connect to the Internet by dialing-up an Internet Service Provider (ISP) over a regular telephone line. This connection is a permanent connection known as a physical circuit. Generally, a Point-to-Point (PPP) data link protocol is used to provision the physical circuit.

Basic ISDN transfers data at 56 Kbps, while an improved form of ISDN has a maximum speed of 128 Kbps. ISDN is, however, expensive, running up to several hundreds of dollars a month. Furthermore, ISDN is only approximately four times the speed of a 33.6 Kbps modem.

Another option, satellite, which uses the same type of mini-dish antenna typical of broadcast television can receive data at up to 400 Kbps. However, transmitted data typically still has to be sent through a traditional analog modem at 33.6 Kbps or 56 Kbps.

Cable modems, enable one to hook up a computer to a local cable television line and receive data at about 1.5 Mbps. This data rate far exceeds that of both 56 Kbps analog modems, and the 128 Kbps of ISDN. The actual bandwidth for Internet service over a cable TV line is up to 27 Mbps for receiving data, and up to about 2.5 Mbps of bandwidth for transmitting data. However, since the local provider may not be connected to the Internet on a line faster than a T1 at 1.5 Mbps, a more likely data rate will be closer to 1.5 Mbps. Cable, however, suffers the drawback that it is carried on existing cable television lines, which not all premises are equipped with. Furthermore, available bandwidth is shared with other cable users in the same geographic area.

DSL, on the other hand, is 20 times faster than satellite connections, 60 times faster than ISDN, and 250 times faster than 33.6 Kbps analog modems. DSL or xDSL, as used herein, refers to different variations of DSL, such as ADSL (Asymmetric Digital Subscriber Line), HDSL (High bit-rate Digital Subscriber Line), and RADSL (Rate Adaptive Digital Subscriber Line). Assuming that the location of one's home or business is close enough to a telephone company central office (CO) that offers DSL service, one can receive data at rates up to 6.1 megabits (millions of bits) per second. More typically, individual connections will provide from 1.544 Mbps to 512 Kbps downstream and about 128 Kbps upstream. Best of all, those bits are transmitted via the same copper wire, otherwise known as a twisted pair, used for telephone calls but without the complex setup of ISDN. DSL does this by taking advantage of unused frequencies that exist on standard telephone lines. An added advantage is that the original POTS (Plain Old Telephone Service) frequencies remain free to handle voice traffic over the same twisted pair. Yet another advantage is that unlike cable modems, DSL users do not share their Broadband connections with others in the same geographical area.

However, not all twisted pairs can support DSL service. The quality of different twisted pairs vary according to geographic region, age, gauge, and the distance from the CO. Speed of transmission slows with an increase in distance between the customer premises and the CO.

Furthermore, bridged taps and splices, which are unconnected copper cable between the customer premises and the CO (the result of anticipating customer needs for future expansion or the result of reassigning copper once routed to one customer to be used by another customer) may also prevent the transmission of DSL signals.

In addition, load coils will prevent the transmission of high-frequency DSL signals within a loop. Load coils were deployed to improve the voice quality of loops greater than 18,000 feet. Still further, Digital Loop Carriers (DLCs) were designed in the early 1970s to combine multiple voice channels (as many as 24 voice lines) into a single T1 transport line. They provided an economical and quick way of adding additional voice lines for remote customers. DLCs use digital techniques similar to those used by DSL equipment. Since the bandwidth of the copper pair is already in use by the DLC equipment, DSL will perform at a greatly reduced rate, if at all, depending on the volume of voice calls and the type of DLC equipment. Connecting DSL equipment to DLCs can also adversely affect the performance of the voice-based system.

Moreover, line noise from adjacent copper cable can affect the performance of DSL service. A number of contributing factors, including cable shielding, unbalanced lines, and the presence of adjacent T1 circuits, can cause line noise. In turn, line noise can affect the error rates of data transmission, resulting in decreased transmission speeds for DSL equipment.

All of these factors affect the ability of the existing infrastructure to carry DSL signals. Depending on local conditions, some of these impediments may make DSL service impossible. Therefore, the fact that voice communication over an existing twisted pair works occurs, is no indication that DSL service can be provisioned over the same twisted pair.

Typically, a request for DSL service is initiated from the user to the DSL ISP. The DSL ISP then requests the local telephone provider to provision a line from the local telephone provider to the user. If the local telephone provider ascertains that DSL service can be provisioned over the user's existing twisted pair, he/she connects a twisted pair to the customer premises and to the CO. The CO is then connected to the DSL network through a router.

Once the twisted pair has been provisioned for DSL service, a technician is then sent out to set up and install a DSL modem at the user premises. It has, however, been estimated, that a typical service call to set up a DSL modem, currently costs in the region of $300 for the DSL ISP.

Recent developments have all but eliminated the need for sending a technician to the user premises to set up and install the DSL modem. Now, the user merely connects the DSL modem to the provisioned twisted pair and a power source, and turns the modem on. The modem then establishes a DSL circuit with the DSL ISP and automatically configures itself with important network information from the ISP, such as an Internet Protocol (IP) address. Further details of such automatic configuration can be found in U.S. patent application Ser. No. 09/668,623, which is incorporated herein by reference.

Today, most DSL communications traverse public networks, such as frame relay networks, over Permanent Virtual Circuits (PVCs). As the name implies, PVCs are static bidirectional connections that are established ahead of time between two end stations. The PVC is permanently available to the user as if the connection is a dedicated or leased line that is continuously reserved for that user. The PVC connection is established manually when the network is configured and consists of the end stations, the transmission medium, and all of the switches between the end stations. After a PVC has been established, a certain amount of bandwidth is reserved for the PVC, and the two end stations do not need to set up or clear connections. Further details about PVC can be found in Request for Comments (RFC) 2955 and RFC 3070 both of which are hereby incorporated by reference.

More recently, the Incumbent Local Exchange Carriers (ILECs), which are traditional local telephone companies such as one of the Regional Bell companies (RBOCs), for example PACIFIC BELL, have started using Point-to-Point over Ethernet (PPPoE) to run the PPP protocol over Ethernet for DSL connections. One such ILEC is AMERITECH of Chicago, U.S.A. PPPoE supports the protocol layers and authentication widely used in PPP and enables a point-to-point connection to be established in the normally-multipoint architecture of Ethernet.

PPPoE allows ILECs to sublease their lines to other ISPs, while making it easier for ISPs to provision services to support multiple users across a dedicated DSL connection. Still further, PPPoE also simplifies the end-user experience by allowing a user to dynamically select between ISPs. However, PPPoE complicates the process of delivering PPP over DSL because for each login a user must supply a username, password, and domain. PPPoE also requires the users to install additional PPPoE client software on their client computers.

The PPPoE functionality, available now in version 2.1 of the REDBACK Subscriber Management System (SMS) 1000 system software, is based on a proposed Internet Engineering Task Force (IETF) specification developed jointly by REDBACK NETWORKS, client software developer ROUTERWARE (Newport Beach, Calif.) and WORLDCOM subsidiary UUNET Technologies (Fairfax, Va.). Further details on PPPoE can be found in RFC 2516 which is hereby incorporated by reference.

The typical user experience with a DSL service using PPPoE involves the following steps:

(1) The user deploys a carrier-supplied Bridging DSL modem pre-configured with a PVC;
(2) The user connects the Ethernet port on a Network Interface Card (NIC) in a client computer to the Ethernet interface on the DSL modem;
(3) The user installs the PPPoE driver;
(4) Using standard WINDOWS dial-up networking capabilities, the user sets up a new PPP connection over the Ethernet-connected DSL modem; and
(5) The user clicks on the particular dial-up networking connection, provides the appropriate user name, domain, and password and clicks connect.

The result is the establishment of a PPP session over Ethernet. This PPP session over Ethernet is bridged by the DSL modem to an ATM PVC which connects in an ISP POP (Point of Presence) to a device, such as a REDBACK SMS 1000, capable of terminating a DSL PPP session. At this point, the user has established a connection to the ISP using a model virtually identical to the dial-up analog model, with the notable exception of a faster connection speed and a greater available bandwidth. Importantly, the entire collection of PPP protocols is unaltered. The Ethernet is simply used as a means to carry PPP messages between a client computer and a remote server. The ISP perceives the connection as a standard PPP session from one of the ISPs subscribers. Also beneficial to the ISP is the fact that if additional user client computers initiate PPP sessions using the same DSL modem and line, no additional PVCs are required. One PVC can support an arbitrary number of PPP sessions, minimizing configuration complexity in the carrier central office.

However, DSL service using PPPoE has a number of disadvantages. First, because the user has to log-in each time a connection is desired, or each time the modem is turned on, a dynamic and not static Internet protocol (IP) address is usually assigned to the client computer and/or DSL modem. An IP address is the address of a computer attached to a TCP/IP (Transmission Control Protocol/Internet Protocol) network, where every network device (client or server) in a network must have a unique IP address. Client computers either have a static, i.e., permanent, IP address or one that is dynamically assigned to them for each communication session. The dynamic IP addresses are typically automatically assigned to the client computer by a DHCP server. Network devices that serve multiple users, such as servers and printers, require a static IP address that does not change, so that data can always be directed to that particular network device. In addition, having a static IP address allows a user to set up a Web-server on his/her client computer. Therefore, it is advantageous to have a static IP address and not a dynamic IP address as typically assigned in a PPPoE network.

Another disadvantage is that each time a PPP connection is made, the user must supply a user name, domain name, and password, such as:

| Username @ domain name: | user1111@company.com |
|---|---|
| Password: | password1111 |

The need for a domain introduces additional complexity into the system, as the ISP must inform the user in advance which domain name to use.

Therefore, even with the above described advances, DSL users typically still have to at least partly configure their DSL modems themselves by manually entering configuration information into the client computer. In addition, the DSL ISPs also typically spend a substantial amount of resources providing telephone assistance to talk DSL users through the installation and configuration process. Still further, the service provider often still needs to send out technicians to the user to install and configure the DSL system. This process is both costly and time consuming.

A need therefore exists for an easier means for provisioning DSL service using PPPoE that can be undertaken by a user with little, or no, technical skill or know-how. Particularly, a system and method whereby a Broadband modem, such as a DSL modem, can be automatically self-configured would be highly desirable.

BRIEF SUMMARY OF THE INVENTION

According to the invention there is provided a computer implemented method for provisioning Broadband service in a Point-to-Point Protocol over Ethernet (PPPoE) network. A Plain Old Telephone System (POTS) connection is established between a Broadband modem and a remote server. A configuration request is then transmitted from the Broadband modem to the remote server using DTMF tones. Subsequently a domain name associated with a Broadband Service Node (BSN) and a user identifier, such as a telephone number, is received from the remote server via the POTS connection using Dual-Tone Multi-Frequency (DTMF) tones. A PPPoE session is then established using the domain name, by firstly authenticating the Broadband modem for the PPPoE session and then configuring the DSL modem. This configuration is accomplished by transmitting a request for configuration details from the Broadband modem to the BSN having the domain name and then receiving configuration details from the configuration server. The Broadband modem then automatically configures itself using the configuration details. Such details preferably include an Internet Protocol (IP) address.

Further, According to the invention there is also provided another computer implemented method for provisioning Broadband service in a Point-to-Point Protocol over Ethernet (PPPoE) network. A Plain Old Telephone System (POTS) call placed from a Broadband modem is answered at a remote server. A telephone number from which the POTS call was placed by the Broadband modem is then determined, preferably using Automatic Number Identification (ANI). A domain name of a Broadband Service Node (BSN) associated with the telephone number is subsequently looked-up. The domain name and the telephone number is then transmitted to the Broadband modem using Dual-Tone Multi-Frequency (DTMF) tones.

Still further, according to the invention there is provided a system for provisioning broadband service in a Point-to-Point Protocol Over Ethernet (PPPoE) network. The system includes a least one client computer, a remote server coupled to a Public Switched Telephone Network (PSTN) and configured to communicate using DTMF tones, and a Broadband modem coupled to the client computer and the PSTN. The Broadband modem includes a memory having instructions for establishing a Plain Old Telephone System (POTS) connection over the PSTN between the Broadband modem and the remote server, instructions for receiving from the remote server via the POTS connection using Dual-Tone Multi-Frequency (DTMF) tones, a domain name associated with a Broadband Service Node (BSN), instructions for transmitting a request for configuration details from the Broadband modem to the BSN having the domain name, where the request is transmitted over a PPPoE network, and instructions for receiving configuration details from the configuration server.

Finally according to the invention there is provided a computer program product for use in conjunction with a computer system for provisioning broadband service in a Point-to-Point Protocol Over Ethernet (PPPoE) network. The computer program product comprises a computer readable storage and a computer program stored therein.

Accordingly, DTMF signaling is used to obtain a domain name, a billing telephone number, and potentially other configuration details to assist in the establishment of a PPPoE session. This allows for the establishment of the PPPoE without any user intervention, such the typing in a username or telephone number. This method and system, therefore, simplifies the provisioning of a PPPoE network, saving the ISP valuable resources.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DETAILED DESCRIPTION OF THE INVENTION

For ease of explanation the following description and drawings represent a DSL system. It should, however, be clear to those skilled in the art that the present invention may be embodied in any Broadband system without departing from the spirit and scope of the present invention as defined in the accompanying claims. A Broadband system, as used herein, is any high speed communication system that communicates over a Broadband circuit and includes the use of a Broadband modem or gateway, such as a DSL modem, cable modem, or the like.

Figure 1:
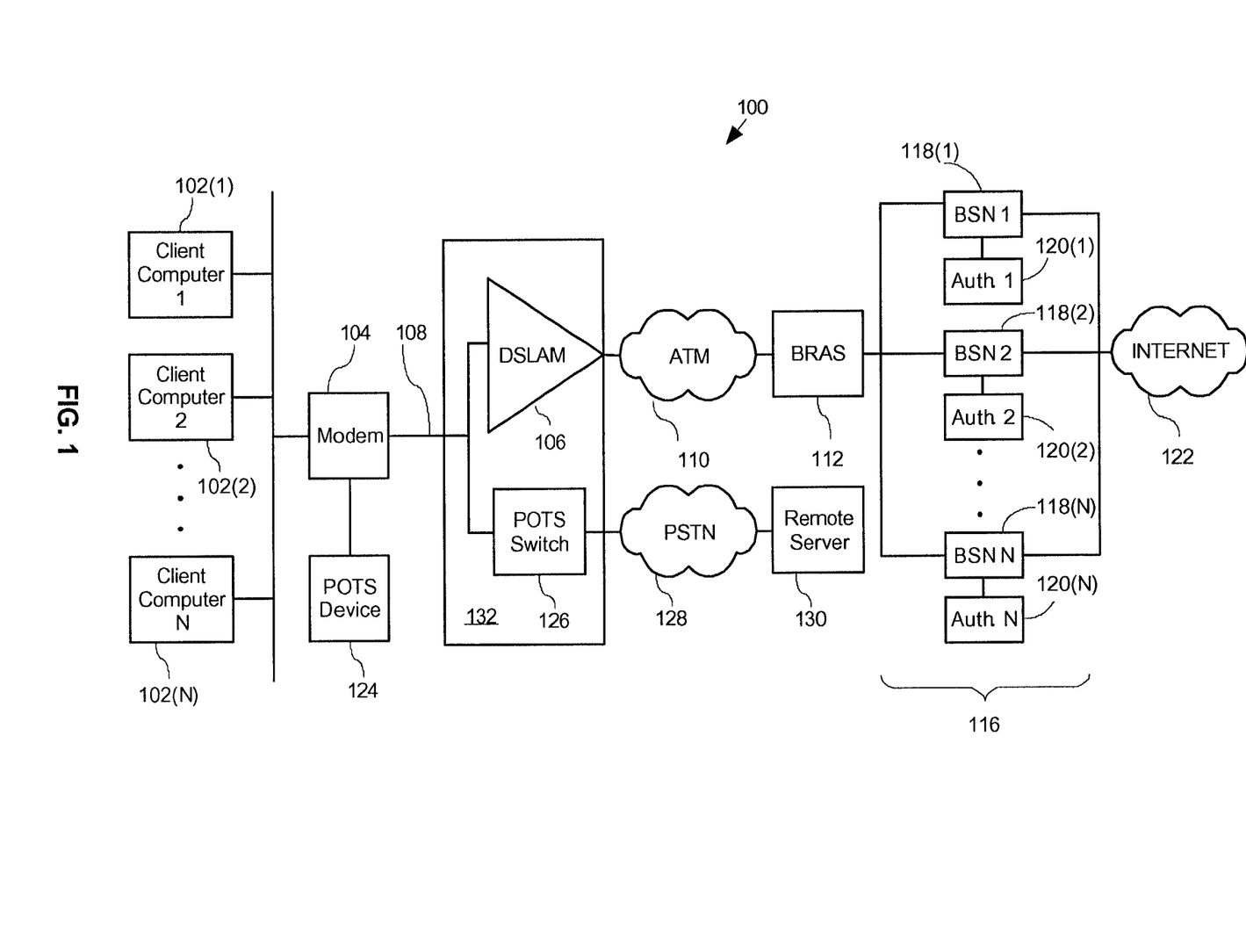
FIG. 1 is a diagrammatic view of the system architecture according to an embodiment of the invention.

FIG. 1 is a diagrammatic view of the system architecture 100 according to an embodiment of the invention. Traditional telephone services, otherwise known as Plain Old Telephone Systems (POTS) allow telephone users to communicate with one another over a Public Switched Telephone Network (PSTN). Typically, copper telephone wires 108, also known as twisted pairs, connect analog input devices (POTS devices) 124, such as telephone sets, to a telephone company central office (CO) 132. The CO 132 in turn connects, through a POTS switch 126, to a PSTN 128 to allow telephone calls to be placed between geographically dispersed POTS devices 124.

The POTS devices 124 take an acoustic signal (which is a natural analog signal) and convert it into an electrical equivalent in terms of volume (signal amplitude) and pitch (frequency of wave change) and communicate the converted signal across the PSTN 128. Analog transmission only uses a small portion of the available amount of information that can be transmitted over copper wires (twisted pairs). The maximum amount of data that can be communicated using analog signals is about 56 Kbps.

A splitter at the telephone company's central office separates voice calls from data. Voice calls are routed by the POTS switch 126 to the a public switched telephone network (PSTN) 128 and thereafter are switched to their destination.

A remote server 130 is coupled to the PSTN 128, preferably over a T1 line, which is a 1.544 Mbps point-to-point dedicated, digital circuit. The remote server 130 is preferably operated by the DSL ISP, and is preferably coupled to other ISP servers (not shown).

Instead, DSL does not convert the digital data into analog form and back again, allowing the telephone company to use a much wider bandwidth for transmission. DSL allows the signal to be separated so that some of the bandwidth is used to transmit an analog signal, such that use of a telephone and computer on the same twisted pair, and at the same time, can occur simultaneously.

Currently, there are two popular types of DSL systems, namely regular ADSL and splitterless ADSL. Asymmetric DSL (ADSL) is for Internet access, where fast downstream is required, but slow upstream is acceptable. Symmetric DSL (SDSL, HDSL, etc.) is designed for short haul connections that require high speed in both directions. Unlike ISDN, which is also digital but travels through the switched telephone network, DSL provides "always-on" operation. Asymmetric DSL shares the same line as the telephone, because it uses higher frequencies than the voice band. However, a POTS splitter must be installed on the customer's premises to separate the line between voice and data. Splitterless ADSL, known as G.lite, Universal ADSL, ADSL Lite, is geared to the consumer by eliminating the splitter and associated installation charge. All telephones on the telephone line must, however, plug into low-pass filters to isolate them from the higher ADSL frequencies.

Each of one or more client computers 102(1)–102(N) are coupled to a DSL modem 104 by any suitable means, such as by Ethernet Category 5 Unshielded Twisted Pair Ethernet cable (CAT 5) through a network hub. The DSL modem 104 in turn connects to a DSL Access Multiplexor (DSLAM) 106 usually located at the CO 132. The DSLAM 106 is a device for DSL service that intermixes voice traffic and DSL traffic onto a twisted pair. It also separates incoming phone and data signals and directs them onto the appropriate network. The DSL modem 104 connects to the DSLAM 106 along a regular copper twisted pair telephone line 108, which may or may not be shared with the POTS device 124.

The DSLAM 106 then connects to an Asynchronous Transfer Mode (ATM) network 110. The ATM network is a network technology for both local and wide area networks (LANs and WANs) that supports realtime voice, video, and data. The ATM topology uses switches that establish a logical circuit from end to end, thereby guaranteeing quality of service (QoS). However, unlike telephone switches that dedicate physical circuits end to end, unused bandwidth in ATM's logical circuits can be appropriated when needed. Furthermore, ATM is highly scalable and supports transmission speeds up to 9953 Mbps.

The ATM network 110 in turn connects to a Broadband Remote Access Server (BRAS) 112 that is essentially a switch that connects to numerous Broadband Service Nodes (BSNs) 118(1)–(N) of an ISP 116. Each BSN may be identified by a unique domain name, i.e., each domain name is an address of a particular BSN. The connection from the BRAS to the BSNs is preferably through an additional ATM network (not shown). Each connection from the BRAS 112 through the additional ATM network to each of the BSNs 118 is called a tunnel.

The BSNs 118 allow ISPs to aggregate tens of thousands of subscribers onto one platform and apply customized Internet Protocol (IP) services to these subscribers. BSNs are deployed preferably at all Points of Presence (POPs). A suitable BSN is the SHASTA 5000 made by NORTEL NETWORKS.

The BSNs 118 connect to the Internet 122 and to authentication servers 120(1)–(N). In this way, the BSNs can route data signals from the BRAS 112 to the Internet 122, at speeds up to 1 Gbps. Although not shown, each BSN and authentication server also connects to other DSL ISP servers. It should be appreciated that the authentication servers 120 is separate (as shown) or may be a single authentication server. Also, each authentication server includes a lookup table (not shown) that lists user identifiers, such as a username which is preferably comprised of the user's telephone number, against configuration details, such as the user's IP address and Local Area Network (LAN) IP Subnet.

Suitable authentication servers 120 are RADIUS (Remote Authentication Dial-In User Service) servers running RADIUS software, such as FUNK STEEL BELTED RADIUS made by FUNK SOFTWARE, Inc.

Figure 2:
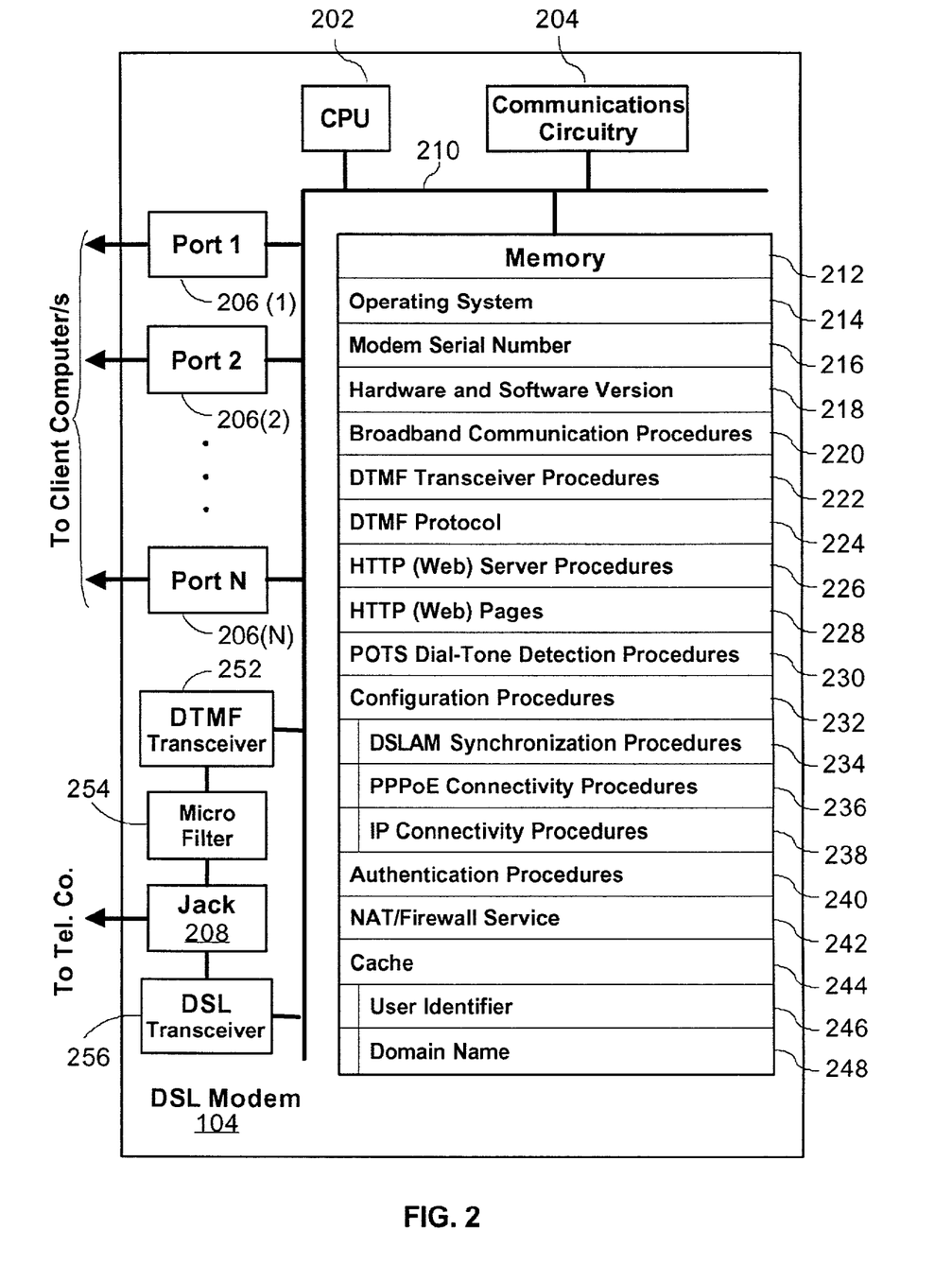
FIG. 2 is a block diagram of the DSL modem shown in FIG. 1.

FIG. 2 is a block diagram of the DSL modem 104 shown in FIG. 1. The DSL modem 104 comprises at least one data processor or central processing unit (CPU) 202, a memory 212, communications circuitry 204, communication ports 206(1)–(N), a communications jack 208, such as a RJ11 female telephone jack, a Dual-Tone Multi-Frequency (DTMF) transceiver 252 coupled through a micro-filter 254 to the communications jack 208, a DSL transceiver 256 also coupled to the communications jack 208, and at least one bus 210 that interconnects these components.

The communications circuitry 204 and/or communication ports 206(1)–(N) preferably include one or more Network Interface Cards (NICs) configured to communicate using Ethernet. Furthermore, the communications circuitry 204 and DTMF transceiver 252 that communicate with the PSTN, preferably include a SILICON LABS Si3044 Direct Access Arrangement (DAA) connected directly to a MOTOROLA MPC850 via a Time Division Multiplexing (TDM) bus. A separate Digital Signal Processor (DSP) is preferably not included in the DSL modem 104. The DAA is the section of DSL modem hardware that connects to the POTS line 116 (FIG. 1) through the communications jack 208. The DAA is required in order to meet the safety requirements of the Federal Communications Commission (FCC). The DTMF transceiver 252 is also preferably capable of simultaneously sending and receiving five to ten DTMF tones per second.

The Si3044 is a DAA that offers global compliance through a programmable telephone line interface. A digital synchronous serial interface is provided to connect to a wide variety of DSPs and host processors. The chipset is fully programmable for AC and DC termination, ringer impedance and ringer threshold, and the device supports billing tone detection, polarity reversal, and pulse dialing enabling it to meet the most stringent global PTT requirements. The Si3044 offers a number of features, including line voltage monitoring (up to 72V in 2.25 V/bit resolution), parallel phone operation, higher transmit/receive levels (up to +3.2 dBm), and lower telephone line current consumption in on-hook line monitor (caller ID) mode.

A Fast Fourier Transform (FFT) algorithm preferably runs on the MPC850 to perform DTMF reception. In a preferred embodiment, the DAA is connected through a microfilter to the inner pair of wires of a telephone line of a single RJ11 jack. However, for SDSL modems, or ADSL modems installed with a splitter, the POTS/PSTN twisted pair is connected to a second RJ11 jack (not shown). However, for splitterless ADSL, the user is not required to connect a separate POTS line to the DSL modem, i.e., only the single POTS line provisioned by the user's local telephone company for DSL service needs to be plugged into the communications jack 208.

Memory 212 preferably includes an operating system 214 (such as VXWORKS™, or EMBEDDED LINUX™), having instructions for communicating, processing, accessing, storing, or searching data, etc. Memory 212 also preferably includes a unique modem serial number 216 and the hardware and software version 218 for the DSL modem hardcoded into the memory 212. In addition, the memory 212 includes Broadband communication procedures 220; DTMF transceiver procedures 222, such as a FFT algorithm; a DTMF protocol 224; HTTP (Web) server procedures 226; HTTP (Web) Pages 228; POTS dial-tone detection procedures 230; configuration procedures 232; authentication procedures 240; NAT/firewall service 242; and a cache 244.

Broadband communication procedures 220 are used for communicating with the client computers 102 (FIG. 1), modem 126 (FIG. 1), DSLAM 106 (FIG. 1), ATM network 134 (FIG. 1); BSNs 136 (FIG. 1), and the Internet 138 (FIG. 1). The DTMF transceiver procedures 222 are used to control communication through the DTMF transceiver 252 and communications jack 208.

The DTMF protocol 224 are the rules governing transmitting and receiving of data used to communicate with the remote server 142 (FIG. 1) over the PSTN 132 (FIG. 1). The DTMF protocol 224 uses DTMF, which is a multifrequency signaling system in which standard set combinations of two specific voice band frequencies, one from a group of four low frequencies and the other from a group of four higher frequencies, are used. The protocol preferably sends and receives DTMF tones at 5 to 10 DTMF tones per second. All communication is synchronous in nature to simplify the protocol. All DTMF signals received are preferably acknowledged by a reply signal.

The HTTP (Web) server procedures 226 are used to serve the HTTP (Web) Pages 228. The POTS dial-tone detector procedures 230 are for detecting the presence of a POTS dial-tone on the twisted pair 108 (FIG. 1). The configuration procedures 232 are used to configure the DSL modem 104 to communicate over a DSL circuit. More specifically, the configuration procedures 232 include DSLAM synchronization procedures 234; PPPoE connectivity procedures 236; and Internet Protocol (IP) connectivity procedures 238. The DSLAM synchronization procedures 234 are used to configure a DSL physical link of a DSL circuit. The PPPoE connectivity procedures 236 are used to configure PPPoE over the DSL circuit. The IP connectivity procedures 238 are used to configure the IP layer of the DSL circuit, as is well understood in the art.

Authentication procedures 240 are used to authenticate a user for DSL service over a PPPoE network as described in relation to FIGS. 5A and 5B below. The Network Address Translation (NAT)/Firewall service 242 is used to convert local IP address of each client computer 102 (FIG. 1) into a global IP address and also serve as a firewall by keeping individual IP addresses hidden from the outside world. Finally, the cache 236 is used to temporarily store data, such as a user identifier 246 and a domain name 248.

Figure 3:
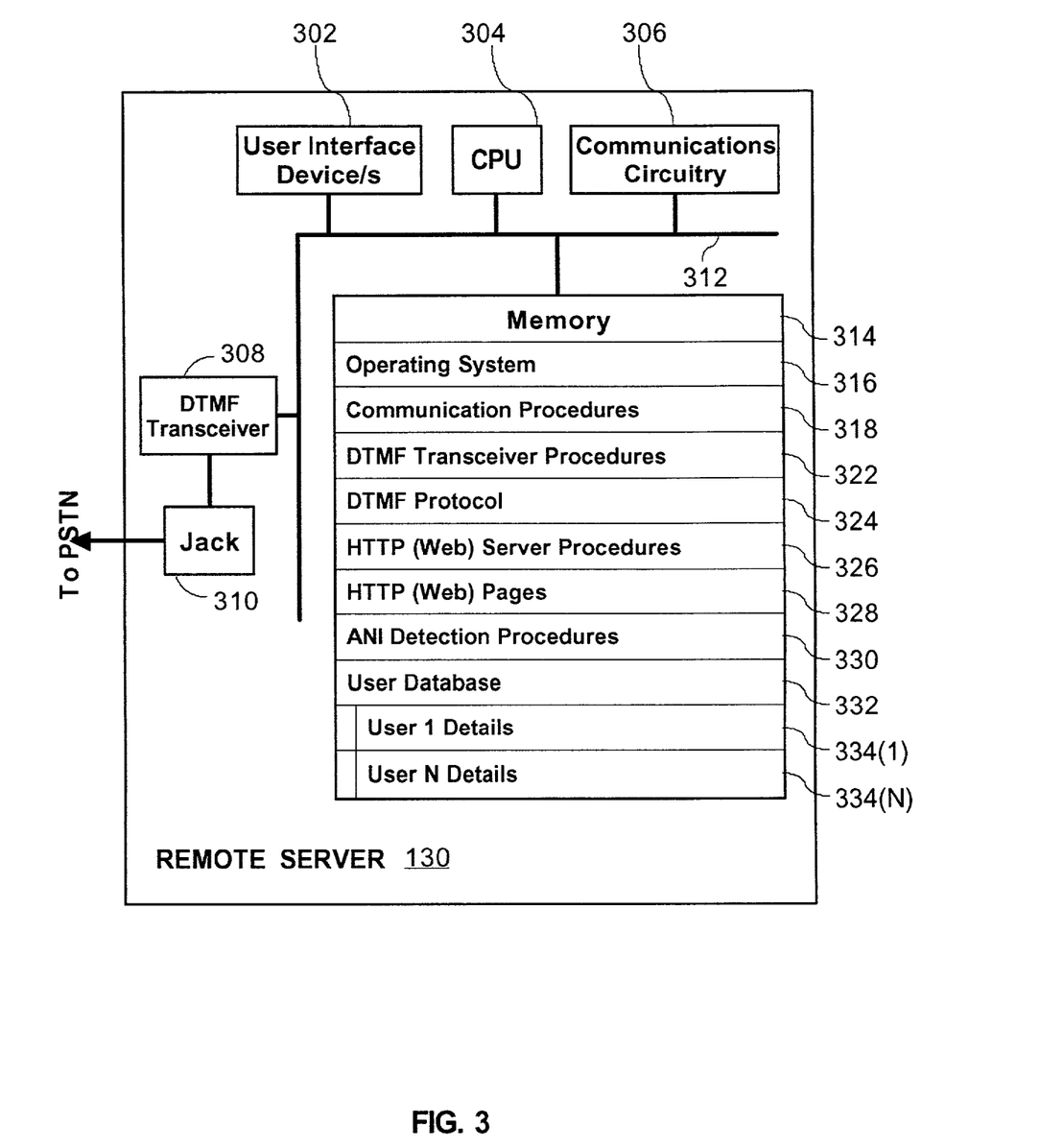
FIG. 3 is a block diagram of the remote server shown in FIG. 1.

FIG. 3 is a block diagram of the remote server 130 shown in FIG. 1. The remote server 130 also comprises at least one data processor or central processing unit (CPU) 304, a memory 314, communications circuitry 306, a DTMF transceiver 308 coupled to a communications jack 310, user interface devices 302, such as a keyboard and monitor, and at least one bus 312 that interconnects these aforementioned components. The communications circuitry 306 preferably consists of one or more T1 cards, while the DTMF transceiver 308 is preferably capable of simultaneously sending and receiving five to ten DTMF tones per second.

Memory 314 preferably includes an operating system 316 (such as WINDOWS NT or LINUX), having instructions for communicating, processing, accessing, storing, or searching data, etc. Memory 314 also preferably includes communication procedures 318; DTMF transceiver procedures 322; a DTMF protocol 324; HTTP (Web) server procedures 326; HTTP (Web) Pages 328; Automatic Number Identification (ANI) detection procedures 330; and a user database 332.

Communication procedures 318 are used for communicating with the DSL ISP's servers (not shown), such as configuration servers, authentication servers, or the like 322. The DTMF transceiver procedures 322 are used to control communication through the DTMF transceiver 308 and communications jack 310. The DTMF protocol 324 is used to communicate with the DSL modem 104 (FIG. 1) over the PSTN 132 (FIG. 1) using DTMF, as described above. The HTTP (Web) server procedures 326 are used to serve the HTTP (Web) Pages 328. The ANI detection procedures 330 are used for identifying the billing telephone number of an incoming call, as is well understood in the art. The user database 332 includes details 334(1) to (N) for each user, such as a user identifier, a telephone number of the telephone line (twisted pair) for which DSL service was provisioned, and a domain name for each user.

Figure 4:
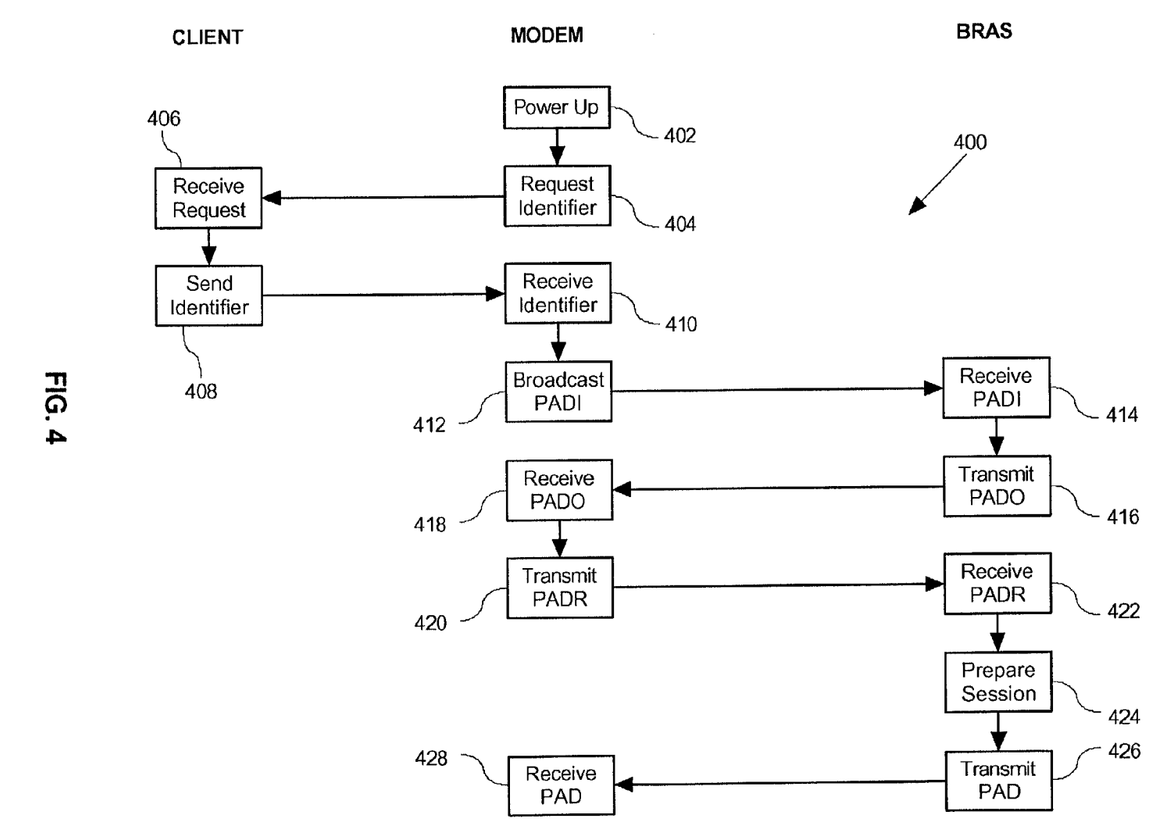
FIG. 4 is a flow chart of a method for establishing a PPPoE session.

FIG. 4 is a flow chart of a method 400 for establishing a PPPoE session. PPPoE has two distinct stages, namely a Discovery stage and a PPP Session stage. When a DSL modem 104 (FIG. 1) wishes to initiate a PPPoE session, it must first perform Discovery to identify the Ethernet MAC address of the BRAS 112 (FIG. 1) and establish a PPPoE SESSION_ID. While PPP defines a peer-to-peer relationship, Discovery is inherently a client-server relationship.

In the Discovery process, the DSL modem 104 (FIG. 1) discovers an BRAS 112 (FIG. 1). When Discovery completes successfully, both the DSL modem 104 (FIG. 1) and the BRAS 112 (FIG. 1) have the information they will use to build their point-to-point connection over Ethernet.

Each Ethernet frame communicated over PPPoE contains the following:

DESTINATION_ADDR
(6 octets)
SOURCE_ADDR
(6 octets)
ETHER_TYPE (2 octets)
payload
CHECKSUM The DESTINATION_ADDR field contains either a unicast Ethernet destination address, or the Ethernet broadcast address (0xffffffff). For Discovery packets, the value is either a unicast or broadcast address as defined in the Discovery section. For PPP session traffic, this field contains the unicast address of the destination device, i.e, the device where the packet is being sent, as determined from the Discovery stage.

The SOURCE_ADDR field contains the Ethernet MAC address of the source device, i.e., the device sending the packet. The ETHER_TYPE is set to either 0x8864 (Discovery Stage) or 0x8864 (PPP Session Stage).

The Ethernet payload for PPPoE is as follows:

| VER | TYPE | CODE | SESSION_ID |
|---|---|---|---|
| LENGTH | | payload | |

The VER field is four bits and contains the version number of the PPPoE specification being used. The TYPE field is four bits and is set to 0x1. The CODE field is eight bits and is defined below for the Discovery and PPP Session stages.

The SESSION_ID field is sixteen bits and its value is fixed for a given PPP session and, in fact, defines a PPP session along with the Ethernet SOURCE_ADDR and DESTINATION_ADDR. The LENGTH field is sixteen bits and indicates the length of the PPPoE payload, while not including the length of the Ethernet or PPPoE headers.

The Discovery stage remains stateless until a PPP session is established. Once a PPP session is established, both the DSL modem 104 (FIG. 1) and the BRAS 112 (FIG. 1) allocate the resources for a PPP virtual interface.

Returning to FIG. 4 once the DSL modem 104 (FIG. 1) has been shipped to the user and the user has connected the communication port/s 206 (FIG. 2) to a client computer 102 (FIG. 1) and connected the communications circuit 204 (FIG. 2) to the DSL ready twisted pair, the DSL modem 104 (FIG. 1) is powered-up 402.

The HTTP (Web) stored procedures 240 and HTTP (Web) Client and Server 226 using the HTTP (Web) Pages 228 then requests 404 a user identifier from the client computer. This user identifier is preferably the user's telephone number. The client computer receives 406 the request and displays the request to the user, preferably via an Internet browser on the client computer. The user then supplies his/her identifier, which is sent 408 by the client computer to the DSL modem, which receives 410 the identifier and stores it in the cache 246 (FIG. 2) as a user identifier 248. It should be appreciated that obtaining and storing the user identifier may occur before (as described here), after, or simultaneously with setting up the PPPoE session.

The DSL modem 104 (FIG. 1) then broadcasts 412 a PPPoE Active Discovery Initiation (PADI) packet with the DESTINATION_ADDR set to the broadcast address. The CODE field is set to 0x09 and the SESSION_ID is set to 0x0000. The PADI packet contains exactly one TAG of TAG_TYPE Service-Name, indicating the service the DSL modem 104 (FIG. 1) is requesting, and any number of other TAG types. An entire PADI packet (including the PPPoE header) does not exceed 1484 octets so as to leave sufficient room for a relay agent to add a Relay-Session-Id TAG.

The BRAS 112 (FIG. 1) receives 414 the PADI and replies by transmitting 416 a PPPoE Active Discovery Offer (PADO) packet. The BRAS transmits 416 the PADO back to the unicast address (DESTINATION_ADDR) of the DSL modem 104 (FIG. 1) that sent the PADI. The CODE field is set to 0x07 and the SESSION_ID is set to 0x0000. The PADO packet contains one BSN-Name TAG containing the BSN's name, a Service-Name TAG identical to the one in the PADI, and any number of other Service-Name TAGs indicating other services that the BRAS 112 (FIG. 1) offers. If the BRAS can not serve the PADI it does not respond with a PADO.

The DSL modem 104 (FIG. 1) receives 418 the PADO and transmits 420 a PPPoE Active Discovery Request (PADR) packet to the BRAS from which it received the PADO. The DESTINATION_ADDR field is set to the unicast Ethernet address of the BRAS 112 (FIG. 1) that sent the PADO. The CODE field is set to 0x19 and the SESSION_ID is set to 0x0000.

The PADR packet contains exactly one TAG of TAG_TYPE Service-Name, indicating the service the DSL modem 104 (FIG. 1) is requesting, and any number of other TAG types.

When the BRAS receives 422 the PADR packet it prepares 424 to begin a PPP session by generating a unique SESSION_ID for the PPPoE session. The BRAS replies 426 to the DSL modem 104 (FIG. 1) with a PPPoE Active Discovery Session-confirmation (PADS) packet. The DESTINATION_ADDR field is the unicast Ethernet address of the DSL modem 104 (FIG. 1) that sent the PADR. The CODE field is set to 0x65 and the SESSION_ID is set to the unique value generated for this PPPoE session. The PADS packet contains exactly one TAG of TAG_TYPE Service-Name, indicating the service under which BRAS 112 (FIG. 1) has accepted the PPPoE session, and any number of other TAG types.

If the BRAS 112 (FIG. 1) does not like the Service-Name in the PADR, then it replies with a PADS containing a TAG of TAG_TYPE Service-Name-Error (and any number of other TAG types). In this case the SESSION_ID is set to 0x0000.

Once the PPPoE session stage begins, PPP data is sent as in any other PPP encapsulation. All Ethernet packets are unicast. The ETHER_TYPE field is set to 0x8864. The PPPoE CODE is set to 0x00. The SESSION_ID does not change for that PPPoE session and is the value assigned in the Discovery stage. The PPPoE payload contains a PPP frame. The frame begins with the PPP Protocol-ID.

A PPPoE Active Discovery Terminate (PADT) packet may be sent any time after a session is established to indicate that a PPPoE session has been terminated. It may be sent by either the DSL modem 104 (FIG. 1) or the BRAS 112 (FIG. 1). The DESTINATION_ADDR field is a unicast Ethernet address, the CODE field is set to 0xa7 and the SESSION_ID is set to indicate which session is to be terminated. No TAGs are required.

When a PADT is received, no further PPP traffic is allowed to be sent using that session. Even normal PPP termination packets are not sent after sending or receiving a PADT. A PPP peer uses the PPP protocol itself to bring down a PPPoE session, but the PADT may be used when PPP cannot be used. Further details of PPPoE can be found in RFC 2516, which is incorporated herein.

Figure 5A:
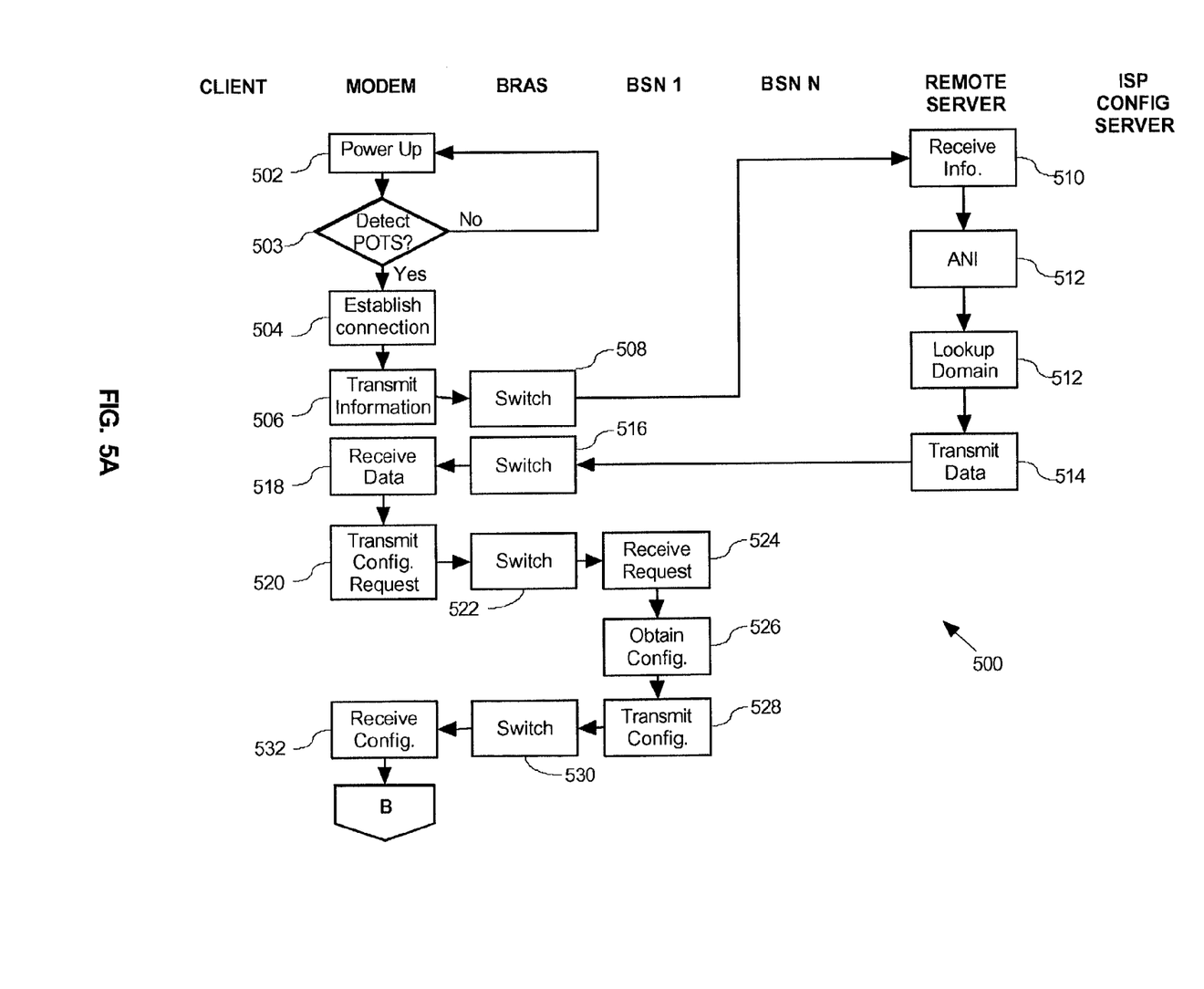
FIGS. 5A and 5B are a flow chart of a method for provisioning DSL service in a PPPoE network according to an embodiment of the invention.
Figure 5B:
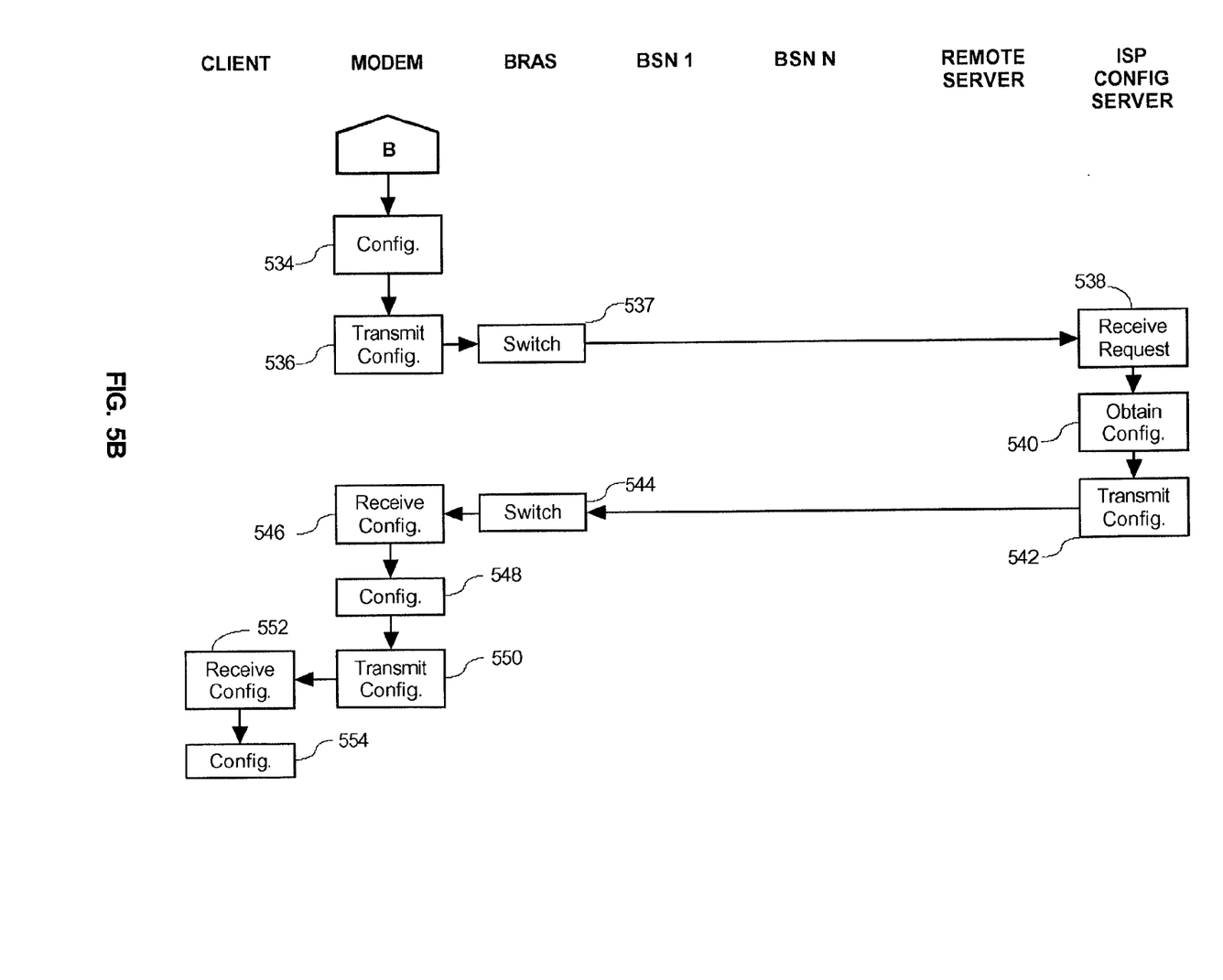

FIGS. 5A and 5B are flow charts of a method 500 for provisioning DSL service in a PPPoE network according to an embodiment of the invention. Once the user has plugged a twisted pair into the communications jack 208 (FIG. 2) and plugged the DSL modem 104 (FIG. 1) into a power source, the DSL modem is powered up 502.

The POTS dial-tone detection procedures 230 (FIG. 2) then attempt to detect 503 a POTS dial-tone on the twisted pair. A POTS dial-tone is a regular telephone dial-tone as heard when lifting a receiver of a telephone handset. If no POTS dial-tone is detected (503-No), then an error signal is displayed to the user, such as by flashing a red light, and the detection 503 of the a POTS dial-tone continues until such time as a POTS dial-tone is detected.

If a POTS dial-tone is detected (503-Yes), then the DTMF transceiver procedures 222 (FIG. 2) establish 504 a POTS connection with the remote server 130. This preferably involves dialing a random one of a number of toll free telephone numbers hardcoded into the DSL modem, where the toll free telephone numbers are associated with the remote server. Alternatively, the DSL modem dials a first toll free number to obtain a second toll free number associated with a specific modem serial number. The second toll free number is then dialed to establish the POTS communication with the remote server 130. The establishment 504 of a POTS connection preferably occurs automatically without user intervention. Also, the remote server automatically answers the call placed to it from the DSL modem.

When establishing the POTS connection, the DSL modem does not dial unless all telephones connected to the twisted pair are on-hook and no ring signal is present. If a telephone goes off-hook at any time during the call, the DSL modem finishes its call and then goes back on-hook, rather than hanging up immediately. Alternatively, the POTS connection is terminated to go on-hook immediately. However, this would not give the customer a dial tone, and in any event the typical length of such a POTS connection is only about 30 seconds long.

It should also be noted that the POTS connection may fail for a number of reasons, such as:

No Dial-tone
    The DSL modem cannot call out if no dial tone is on the line, but it will display a message to the user on a status web page informing the user of the error.

POTS line busy
    The DSL modem will not interrupt the user's POTS call. It will make its call to the remote server when the user hangs up.

User interrupts DSL DSL modem's call
    The DSL modem will continue its call and hang up when finished. This takes less than 30 seconds.

DSL modem unable to reach remote server
    This may happen for many reasons, such as the remote server is busy, the remote server is down, or there is a problem with the PSTN. In this case, the will implement a back-off algorithm so that it does not tie up the user's phone line (twisted pair). The DSL modem will preferably attempt a second call in one hour, a third call in six hours, a fourth call in 24 hours, and a fifth call in three days. If the fifth call does not go through, it will give up. The back-off algorithm is reset when the DSL modem is power cycled or when a particular failure condition is repaired.

Once the POTS connection has been established 504 between the DSL modem 104 (FIG. 1) and the remote server 130 (FIG. 1), communication occurs using the DTMF transceivers 252 (FIG. 2) and 308 (FIG. 3), DTMF transceiver procedures 222 (FIG. 2) and 322 (FIG. 3), and DTMF protocol 224 (FIG. 2) and 324 (FIG. 3).

The DSL modem preferably then transmits 506 information to the remote server. This information may simply include a request for data, such as configuration data. The information may include the modem's hardware and software version 218 (FIG. 2), serial number 216 (FIG. 2), the DTMF Protocol version number, or the like. Alternatively, a request does not need to be made. Rather, the remote server knows to automatically send the required data, once the connection has been established 504.

The information is switched 508 by the BRAS 112 (FIG. 1) to the remote server 130 (FIG. 1), which receives 510 the information. Using the ANI detection procedures 330 (FIG. 3), the remote server then determines 512 the billing telephone number of the twisted pair from which the POTS connection was established 504, as is well understood in the art. Furthermore, the remote server uses the detected telephone number to lookup 513 in the user database 332 (FIG. 3) the domain name of the BSN 118 (FIG. 1) associated to that particular user (detected telephone number). Data, including the detected telephone number and the located domain name, are then transmitted 514 back to the BRAS, which switches 516 the data to the DSL modem.

The DSL modem is now in possession of the billing telephone number of the twisted pair from which the POTS connection was established. As mentioned previously, to establish a PPPoE session, a username, domain name, and password are required. The DSL modem preferably uses the detected telephone number as the username, thereby eliminating the need to the user to enter a username.

In an alternative embodiment, all configuration information for the DSL modem can be downloaded from the remote server to the DSL modem using DTMF signals. However, this is not preferred as the broadband link (DSL circuit) is typically much faster than the DTMF connection.

The DSL modem receives 518 the data and transmits 520 a request for basic configuration details to a configuration BSN having the above located domain name. This communication occurs over PPPoE. Therefore, as required by PPPoE, a username, domain name, and password are supplied as part of the request. The username preferably comprises the located telephone number, while the password is preferably set to a generic password. The domain name is the located domain name described above. The request is switched 522 by the BRAS to the BSN having the above located domain name, which receives 524 the request. Based on the telephone number, the BSN obtains 526 the basic configuration details for that particular DSL modem. These details preferably includes a user specific static IP address for the DSL modem. The basic configuration details are then transmitted 528 back to the DSL modem. The BRAS switches 530 the basic configuration details to the DSL modem, which receives them at 532.

The DSL modem then configures 534 itself with the basic configuration details, and preferably reboots. In a preferred embodiment, the DSL modem now has a routable IP address and can communicate using IP, preferably a dynamic IP address. However, in a preferred embodiment, the DSL modem may require more detailed configuration details. In this case, the DSL modem transmits 536 a request for full configuration details to the an ISP configuration server (not shown). The request preferably contains the detected telephone number. The BRAS switches 537 the request for full configuration details to the ISP configuration server, which receives 538 them. The ISP configuration server then obtains 540 the full configuration details for the particular DSL modem, based on the detected telephone number, and transmits 542 them to the DSL modem. The BRAS switches 544 the full configuration details to the DSL modem, which receives them at 546.

The DSL modem then configures 546 itself with the full configuration details, and preferably reboots. The full configuration details preferably include a static IP address for the DSL modem. In an embodiment where a client computer 102 (FIG. 1) has already been coupled to the DSL modem 104 (FIG. 1), the DSL modem may transmit 550 client computer configuration details, obtained from the ISP configuration server, to the client computer. In this case, the client computer receives 552 the client computer configuration details, such as an IP address, configures itself 554, and preferably reboots.

As a result, the user does not have to be informed about the domain name to be used and the user does not have to supply an identifier or a domain name during the provisioning process. The user simply couples the DSL modem to a provisioned DSL telephone line (twisted pair), plugs the DSL modem onto a power outlet, and powers the DSL modem up. Thereafter, the DSL modem automatically, i.e., without user intervention, obtains configuration details used to configure itself.

While the foregoing description and drawings represent the preferred embodiment of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A computer implemented method for provisioning Broadband service in a Point-to-Point Protocol over Ethernet (PPPoE) network, comprising:
    establishing a Plain Old Telephone System (POTS) connection between a Broadband modem and a remote server;
    receiving from said remote server via said POTS connection using Dual-Tone Multi-Frequency (DTMF) tones, a domain name associated with a Broadband Service Node (BSN); and
    establishing a PPPoE session using said domain name.

2. The method of claim 1, wherein said establishing step comprises authenticating said Broadband modem for said PPPoE session.

3. The method of claim 1, wherein said establishing step comprises:
    transmitting a request for configuration details from said Broadband modem to said BSN having said domain name, where said request is transmitted over a PPPoE network; and
    receiving configuration details from said configuration server.

4. The method of claim 1, further comprising, prior to said receiving step, the step of transmitting a configuration request from said Broadband modem to said remote server using DTMF tones.

5. The method of claim 1, wherein said receiving comprises further acquiring from said remote server via said POTS connection using DTMF tones, a user identifier.

6. The method of claim 5, wherein said establishing comprises transmitting said user identifier as a username to establish said PPPoE session.

7. The method of claim 5, wherein said user identifier is a telephone number associated with a twisted pair through which said Broadband modem established said POTS connection.

8. The method of claim 5, wherein said transmitting further comprises sending said request, where said request contains said user identifier.

9. The method of claim 1, wherein said receiving step comprises acquiring configuration details unique to said Broadband modem.

10. The method of claim 1, further comprising automatically configuring said Broadband modem with said configuration details.

11. The method of claim 1, wherein said configuration details include a dynamic Internet Protocol (IP) address.

12. The method of claim 1, further comprising:
    transmitting a request for full configuration details to a configuration server over said PPPoE network, where said request for full configuration details contains a user identifier;
    receiving full configuration details from said configuration server; and
    automatically configuring said Broadband modem with said full configuration details.

13. The method of claim 12, wherein said full configuration details include a static IP address.

14. The method of claim 1, further comprising, prior to said establishing step, the step of detecting a POTS dialtone.

15. A computer implemented method for provisioning Broadband service in a Point-to-Point Protocol over Ethernet (PPPoE) network, comprising:
    establishing a Plain Old Telephone System (POTS) connection between a Broadband modem and a remote server;
    receiving from said remote server via said POTS connection using Dual-Tone Multi-Frequency (DTMF) tones, a domain name associated with a Broadband Service Node (BSN);
    transmitting a request for configuration details from said Broadband modem to said BSN having said domain name, where said request is transmitted over a PPPoE network;
    receiving configuration details from said configuration server;
    configuring said Broadband modem using at least part of said configuration details; and
    transmitting at least part of said configuration details to a client computer coupled to said Broadband modem to enable said client computer to configure itself.

16. A computer implemented method for provisioning Broadband service in a Point-to-Point Protocol over Ethernet (PPPoE) network, comprising:
    answering at a remote server a Plain Old Telephone System (POTS) call placed from a Broadband modem to said remote server;
    determining a telephone number from which said POTS call was placed by said Broadband modem;
    looking-up a domain name of a Broadband Service Node (BSN) associated with said telephone number;
    transmitting said domain name and said telephone number to said Broadband modem using Dual-Tone Multi-Frequency (DTMF) tones.

17. The method of claim 16, wherein said determining step uses Automatic Number Identification (ANI) to determine said telephone number.

18. The method of claim 16, further comprising, prior to said determining step, the step of receiving a configuration request from said Broadband modem, where said request is transmitted using DTMF tones.

19. A system for provisioning broadband service in a Point-to-Point Protocol Over Ethernet (PPPoE) network, comprising:
    a least one client computer;
    a remote server coupled to a Public Switched Telephone Network (PSTN) and configured to communicate using DTMF tones;

a Broadband modem coupled to said client computer and said PSTN, said Broadband modem including a memory comprising:
  instructions for establishing a Plain Old Telephone System (POTS) connection over said PSTN between said Broadband modem and said remote server;
  instructions for receiving from said remote server via said POTS connection using Dual-Tone Multi-Frequency (DTMF) tones, a domain name associated with a Broadband Service Node (BSN);
  instructions for transmitting a request for configuration details from said Broadband modem to said BSN having said domain name, where said request is transmitted over a PPPoE network; and
  instructions for receiving configuration details from said configuration server.

20. The system of claim 19, further comprising:
a Digital Subscriber Line Access Multiplexor (DSLAM) coupled between said Broadband modem and said BSN;
an Asynchronous Transfer Mode (ATM) network coupled between said DSLAM and said BSN; and
a Broadband Remote Access Server (BRAS) coupled between said ATM network and said single configuration BSN.

21. The system of claim 19, further comprising:
multiple Broadband Service Nodes (BSNs) coupled to said modem, where each of said BSNs is associated with a different domain name; and
an authentication server coupled to each one of said multiple BSNs.

22. The system of claim 21, wherein said multiple BSNs are coupled to the Internet.

23. The system of claim 19, further comprising a POTS switch coupled between said Broadband modem and said PSTN.

24. A computer program product for use in conjunction with a computer system for provisioning broadband service in a Point-to-Point Protocol Over Ethernet (PPPoE) network, the computer program product comprising a computer readable storage and a computer program stored therein, the computer program comprising:
  instructions for establishing a Plain Old Telephone System (POTS) connection between a Broadband modem and a remote server;
  instructions for receiving from said remote server via said POTS connection using Dual-Tone Multi-Frequency (DTMF) tones, a domain name associated with a Broadband Service Node (BSN);
  instructions for transmitting a request for configuration details from said Broadband modem to said BSN having said domain name, where said request is transmitted over a PPPoE network; and
  instructions for receiving configuration details from a configuration server.

* * * * *